(12) United States Patent
Cho

(10) Patent No.: US 11,222,191 B2
(45) Date of Patent: Jan. 11, 2022

(54) METHOD FOR OBTAINING CALIBRATION DATA AND ELECTRONIC DEVICE THEREFOR

(71) Applicant: Samsung Electronics Co., Ltd., Gyeonggi-do (KR)

(72) Inventor: Jungwoo Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/986,939

(22) Filed: Aug. 6, 2020

(65) Prior Publication Data

US 2021/0042496 A1 Feb. 11, 2021

(30) Foreign Application Priority Data

Aug. 7, 2019 (KR) ........................ 10-2019-0096267

(51) Int. Cl.
*G06K 9/00* (2006.01)
*G06T 7/80* (2017.01)
*G06F 21/32* (2013.01)

(52) U.S. Cl.
CPC ......... *G06K 9/00013* (2013.01); *G06F 21/32* (2013.01); *G06K 9/00067* (2013.01); *G06T 7/80* (2017.01)

(58) Field of Classification Search
CPC .. G06K 9/00013; G06K 9/00067; G06T 7/80; G06F 21/32
See application file for complete search history.

(56) References Cited

U.S. PATENT DOCUMENTS

| 7,965,874 | B2 | 6/2011 | Abiko et al. |
| 9,195,879 | B1 | 11/2015 | Du et al. |
| 9,330,325 | B2 | 5/2016 | Shin et al. |
| 9,424,458 | B1 | 8/2016 | Mather et al. |
| 9,785,823 | B2 | 10/2017 | Mather et al. |
| 9,911,184 | B2 | 3/2018 | Du et al. |
| 10,325,134 | B2 | 6/2019 | Andersson et al. |
| 10,521,643 | B2 | 12/2019 | Mather et al. |
| 10,699,094 | B2 | 6/2020 | Shim et al. |
| 10,706,251 | B2 | 7/2020 | Shim et al. |
| 2006/0056700 | A1 | 3/2006 | Abiko et al. |

(Continued)

FOREIGN PATENT DOCUMENTS

| JP | 2018-508888 | 3/2018 |
| KR | 2013-0024501 | 3/2013 |
| KR | 1432011 | 8/2014 |

OTHER PUBLICATIONS

International Search Report dated Dec. 2, 2020 issued in counterpart application No. PCT/KR2020/010250, 3 pages.

*Primary Examiner* — Lixi C Simpson
(74) *Attorney, Agent, or Firm* — The Farrell Law Firm, P.C.

(57) ABSTRACT

A method for generating calibration data of an electronic device includes obtaining a plurality of background images through at least part of a display of the electronic device, using a fingerprint sensor positioned under the display of the electronic device, obtaining a variation between the plurality of background images, when the variation is less than or equal to a threshold value, generating calibration data for the fingerprint sensor, using at least one background image of the plurality of background images, and storing the generated calibration data in a memory of the electronic device.

13 Claims, 15 Drawing Sheets

(56) References Cited

U.S. PATENT DOCUMENTS

| | | | |
|---|---|---|---|
| 2013/0129144 A1* | 5/2013 | Chang | G06K 9/62 |
| | | | 382/103 |
| 2016/0232401 A1 | 8/2016 | Hoyos et al. | |
| 2018/0365466 A1 | 12/2018 | Shim et al. | |
| 2019/0050620 A1 | 2/2019 | Andersson et al. | |
| 2019/0188442 A1* | 6/2019 | Flament | G06K 9/0004 |
| 2019/0197285 A1 | 6/2019 | Shim et al. | |
| 2021/0019488 A1* | 1/2021 | Chau | G06K 9/2018 |

\* cited by examiner

METHOD FOR OBTAINING CALIBRATION DATA AND ELECTRONIC DEVICE THEREFOR

CROSS-REFERENCE TO RELATED APPLICATION(S)

This application is based on and claims priority under 35 U.S.C. § 119 to Korean Patent Application No. 10-2019-0096267, filed on Aug. 7, 2019, in the Korean Intellectual Property Office, the disclosure of which is incorporated by reference herein in its entirety.

BACKGROUND

1. Field

The disclosure relates generally to a method for obtaining calibration data and an electronic device therefor.

2. Description of Related Art

An electronic device may include a sensor for recognizing biometric information, such as a fingerprint. As the display size of a portable electronic device increases, the size of a region excluding the display on the front surface of the electronic device may be relatively reduced. Accordingly, research is being conducted to mount various sensors on the front surface of the electronic device while the display size is increased. For example, constant attempts are being made to realize a large screen by placing a fingerprint sensor of the electronic device in the display region of the display and reducing or removing the non-display region.

A fingerprint sensor may be positioned on the rear surface of a display module. The fingerprint sensor may radiate an optical signal or an ultrasonic signal and may obtain biometric data (e.g., a fingerprint) using reflection waves reflected by an external object (e.g., a finger). When the fingerprint sensor is located on the rear surface of the display module, the fingerprint sensor may obtain a fingerprint image through at least a partial layer of the display module. In this case, the fingerprint sensor may obtain, not only the fingerprint image of a finger positioned on the front surface of the display, but also other noise components. For example, the noise components may include noise caused by at least a partial layer of the display module, noise received from other components inside an electronic device, noise caused by signals reflected by other components, as well as other dynamic types of noise.

These noise components may interfere with the fingerprint recognition of the fingerprint sensor. To remove the noise components, the electronic device may obtain a background image including noise in a state where a finger is not touched and may generate calibration data using the background image. The electronic device may increase the recognition rate of the fingerprint image by calibrating the obtained fingerprint image using the calibration data. Because the state of the electronic device may be changed over time, preferably, the calibration data may be periodically updated. When the electronic device generates calibration data using a background image including dynamic noise, the dynamic noise may be used to calibrate the fingerprint image. In this case, a result in which a dynamic noise component is introduced into the fingerprint image may occur whenever a fingerprint is recognized.

SUMMARY

The present disclosure has been made to address the above-mentioned problems and disadvantages, and to provide at least the advantages described below.

In accordance with an aspect of the disclosure, an electronic device includes a housing, a display, a fingerprint sensor disposed under the display and configured to obtain a fingerprint image, a processor operatively connected to the display and the fingerprint sensor, and a memory operatively connected to the processor. The memory stores instructions that, when executed, cause the processor to obtain a plurality of background images, using the fingerprint sensor; obtain a variation between the plurality of background images; when the variation satisfies a specified condition, generate calibration data, using at least one background image of the plurality of background images; and store the generated calibration data in the memory.

In accordance with another aspect of the disclosure, a method for generating calibration data of an electronic device includes obtaining a plurality of background images through at least part of a display of the electronic device, using a fingerprint sensor positioned under the display of the electronic device; obtaining a variation between the plurality of background images; when the variation is less than or equal to a threshold value, generating calibration data for the fingerprint sensor, using at least one background image of the plurality of background images; and storing the generated calibration data in a memory of the electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
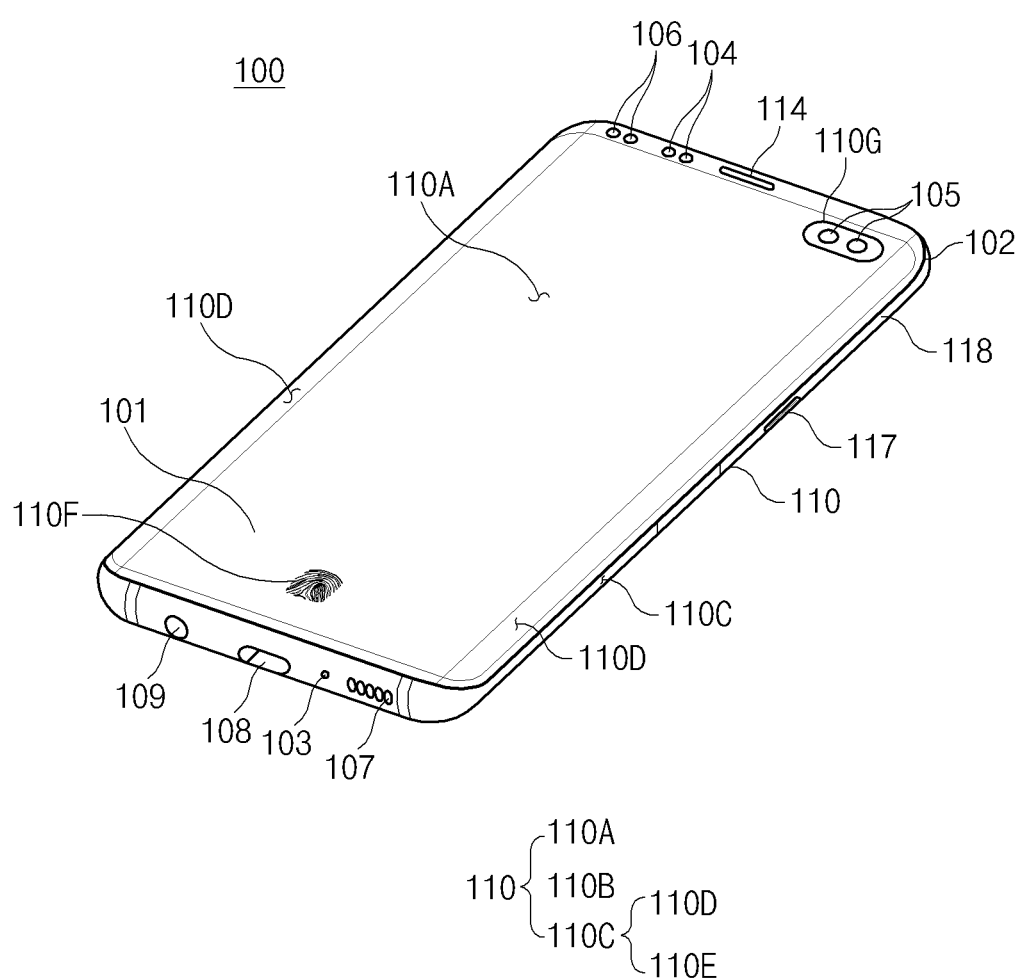
FIG. 1 is a front perspective view of an electronic device, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Figure 2:
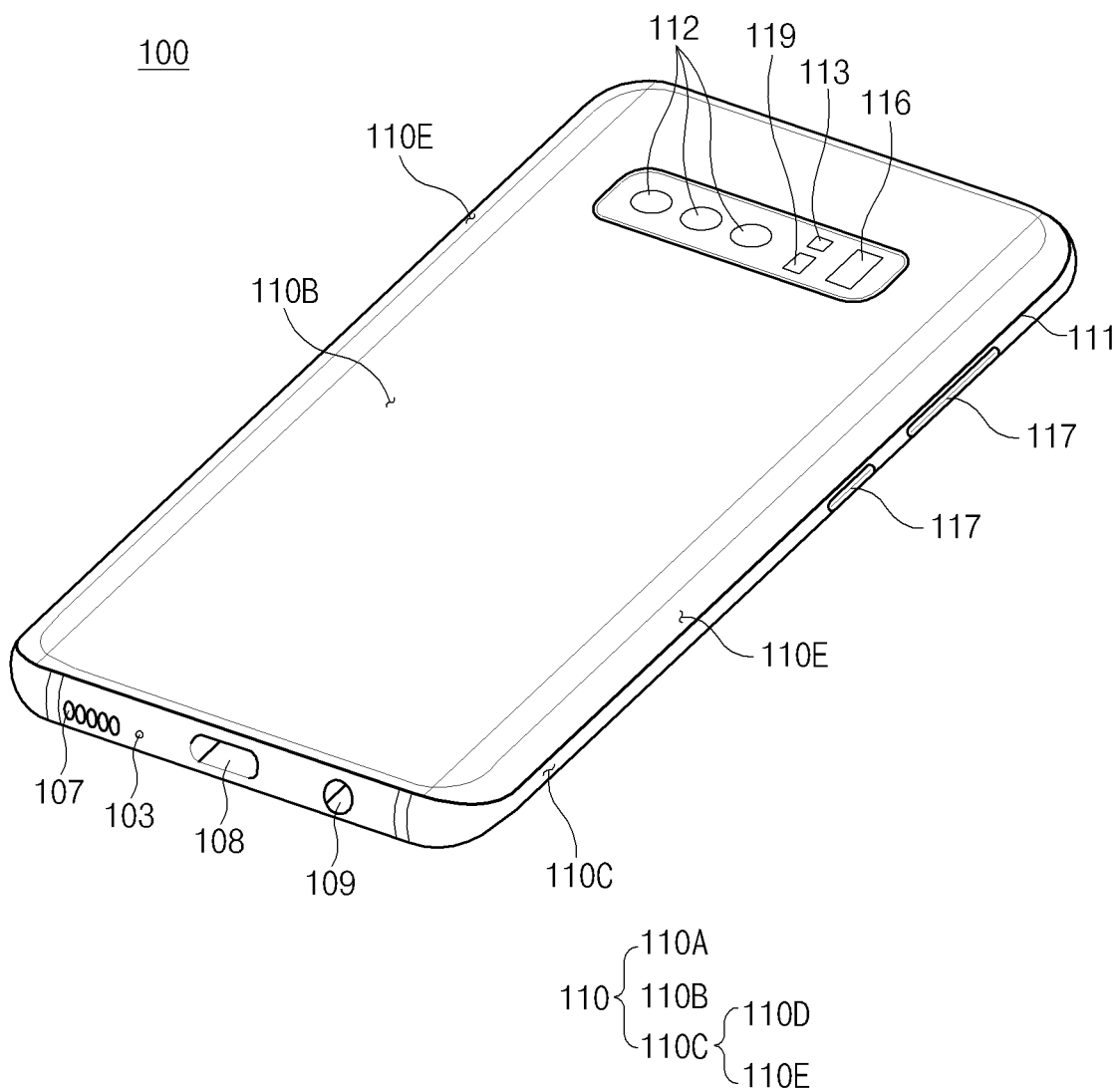
FIG. 2 is a rear perspective view of the electronic device illustrated in FIG. 1, according to an embodiment.

FIG. 1 is a front perspective view of an electronic device, according to an embodiment. FIG. 2 is a rear perspective view of the electronic device illustrated in FIG. 1, according to an embodiment.

Referring to FIGS. 1 and 2, an electronic device 100 includes a housing 110 including a first surface (or a front surface) 110A, a second surface (or a rear surface) 110B, and a side surface 110C surrounding a space between the first surface 110A and the second surface 110B.

The housing 110 may refer to a structure that forms a part of the first surface 110A, the second surface 110B, and the side surface 110C of FIG. 1.

The first surface 110A may be implemented with a front plate 102 (e.g., a glass plate including various coating layers, or a polymer plate), at least part of which is substantially transparent. The second surface 110B may be implemented with a rear plate 111 that is substantially opaque. For example, the rear plate 111 may be implemented with a coated or colored glass, a ceramic, a polymer, a metal (e.g., aluminum, stainless steel (STS), or magnesium), or a combination of at least two of the materials. The side surface 110C may be coupled with the front plate 102 or the rear plate 111 and may be implemented with a side bezel structure (or a side member) 118 including a metal and/or a polymer.

The rear plate 111 and the side bezel structure 118 may be integrally formed and may include the same material (e.g., a metal material such as aluminum).

The front plate 102 may include two first regions 110D, which are bent toward the rear plate 111 from the first surface 110A so as to be seamlessly extended, at opposite long edges of the front plate 102.

Referring to FIG. 2, the rear plate 111 includes two second regions 110E, which are bent toward the front plate 102 from the second surface 110B so as to be seamlessly extended, at opposite long edges of the rear plate 111.

The front plate 102 (or the rear plate 111) may include only one of the first regions 110D or the second regions 110E. The front plate 102 or the rear plate 111 may not include a part of the first regions 110D or the second regions 110E.

When viewed from the side of the electronic device 100, the side bezel structure 118 may have a first thickness (or width) on a side surface (e.g., a short side) where the first regions 110D or the second regions 110E are not included, and may have a second thickness on a side surface (e.g., a long side) where the first regions 110D or the second regions 110E are included. The second thickness may be less than the first thickness.

The electronic device 100 may include at least one or more of a display 101, an audio module (e.g., a microphone hole 103, an external speaker hole 107, or a receiver hole 114), a sensor module (e.g., a first sensor module 104, a second sensor module 116, or a third sensor module 119), a camera module (e.g., a first camera device 105, a second camera device 112, or a flash 113), key input devices 117, a light-emitting device 106, and a connector hole (e.g., a first connector hole 108 or a second connector hole 109). The electronic device 100 may not include at least one of the components (e.g., the key input devices 117, a sensor module, or the light-emitting device 106), or may further include other components.

The display 101 may be exposed through a considerable portion of the front plate 102. At least part of the display 101 may be exposed through the first surface 110A and the front plate 102 including the first regions 110D of the side surface 110C. The first surface 110A and the first regions 110D may be referred to as screen display regions.

The corners of the display 101 may be formed to be mostly identical to a shape of an outer portion of the front plate 102 adjacent thereto. To increase the area where the display 101 is exposed, a difference between an outer portion of the display 101 and an outer portion of the front plate 102 may be similarly formed.

The surface (e.g., the front plate 102) of the housing 110 may include a screen display region formed as the display 101 to be exposed visually. The screen display region may include the first surface 110A and the first regions 110D of the side surface.

The first surface 110A and the first regions 110D may include a sensing region 110F configured to obtain the biometric information of a user. The phrase "the first surface 110A and the first regions 110D include the sensing region 110F" may mean that at least part of the sensing region 110F is capable of being overlapped with the first surface 110A and the first regions 110D. In other words, like other regions of the first surface 110A and the first regions 110D, the sensing region 110F may display visual information by the display 101. Additionally, "the sensing region 110F" may mean a region capable of obtaining the biometric information (e.g., a fingerprint) of the user.

The first surface 110A and the first regions 110D of the display 101 may include a region 110G to which the first camera device 105 (e.g., a punch hole camera) is capable of being exposed visually. At least part of the edge of the region where the first camera device 105 is exposed may be surrounded by the first surface 110A and the first regions 110D.

A recess or an opening may be formed in a part of the first surface 110A and the first regions 110D of the display 101. At least one or more of the receiver hole 114, the first sensor module 104, and the light-emitting device 106, which are aligned with the recess or the opening, may be included in the part of the first surface 110A and the first regions 110D of the display 101.

The display 101 may include at least one or more of the receiver hole 114, the sensor modules, and the light-emitting device 106 on the rear surface of the first surface 110A and the first regions 110D.

The display 101 may be coupled with (or disposed adjacent to) a touch sensing circuit, a pressure sensor capable of measuring the intensity (or pressure) of a touch, and/or a digitizer capable of detecting a magnetic stylus pen.

At least part of the sensor modules and/or at least part of the key input device 117 may be disposed in the side surface 110C, the first regions 110D and/or the second region 110E.

The audio module(s) may include the microphone hole 103, the external speaker hole 107, and/or the receiver hole 114. A microphone for obtaining external sound may be disposed within the microphone hole 103. A plurality of microphones may be disposed to make it possible to detect a direction of sound. A speaker hole may include the external speaker hole 107 and the receiver hole 114 for making a call. The speaker hole and the microphone hole 103 may be implemented with one hole, or a speaker (e.g., a piezoelectric speaker) may be included without the speaker hole.

The sensor module(s) (e.g., the first sensor module 104, the second sensor module 116, and/or the third sensor module 119) may generate an electrical signal or a data value corresponding to an internal operation state of the electronic device 100 or corresponding to an external environment state. The first sensor module 104 (e.g., a proximity sensor) may be disposed on the first surface 110A of the housing 110, the second sensor module 116 (e.g., a time of flight (ToF) camera device) may be disposed on the second surface 110B of the housing 110, the third sensor module 119 (e.g., a heart rate monitor (HRM) sensor) may be disposed on the second surface 110B of the housing 110, and/or a fourth sensor module (e.g., the sensor 190 of FIG. 3) (e.g., a fingerprint sensor) may be coupled with the display 101.

The second sensor module 116 may include a TOF camera device for distance measurement.

At least part of the fourth sensor module may be disposed under the first surface 110A and the first regions 110D. For example, the fourth sensor module may be disposed in a recess 139 formed on the rear surface of the display 101. That is, the fourth sensor module may not be exposed to the first surface 110A and the first regions 110D, and the sensing region 110F may be formed in at least part of the first surface 110A and the first regions 110D.

The fingerprint sensor may be disposed on the second surface 110B as well as the first surface 110A and the first regions 110D of the housing 110.

The electronic device 100 may further include a sensor module such as a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

The camera module(s) may include a first camera device 105 (e.g., a punch hole camera device) exposed to the first surface 110A of the electronic device 100, a second camera module 112 exposed to the second surface 110B of the electronic device 100, and/or a flash 113.

The first camera device 105 may be exposed through a part of the screen display regions 110D of the first surface 110A. For example, the first camera device 105 may be exposed to a part of the screen display regions 110D through an opening formed in a part of the display 101.

The second camera device 112 may include a plurality of camera devices (e.g., a dual camera or a triple camera). However, the second camera device 112 may not be necessarily limited to including a plurality of camera devices, and may include a single camera device.

The first camera device 105 and the second camera device 112 may include one or more lenses, an image sensor, and/or an image signal processor. The flash 113 may include, for example, a light emitting diode (LED) or a xenon lamp. Two or more lenses (e.g., IR camera lenses, wide-angle lenses and telephoto lenses) and image sensors may be disposed on one surface of the electronic device 100.

The key input devices 117 may be disposed on the side surface 110C of the housing 110. The electronic device 100 may not include all or a part of the above-mentioned key input devices 117, and another key input device may be implemented on the display 101 in the form of a soft key. The key input device may include a sensor module 190 formed in the sensing region 110F included in the first surface 110A and the first regions 110D.

The light-emitting device 106 may be disposed on the first surface 110A of the housing 110. The light-emitting device 106 may provide status information of the electronic device 100 in the form of light. The light-emitting device 106 may provide a light source operating in conjunction with an operation of the first camera module 105. The light-emitting device 106 may include an LED, an IR LED, and a xenon lamp.

The first connector hole 108 may be capable of accommodating a connector (e.g., a universal serial bus (USB) connector) for transmitting/receiving power and/or data with an external electronic device. The second connector hole 109 (or an earphone jack) may be capable of accommodating a connector for transmitting/receiving an audio signal with the external electronic device.

Figure 3:
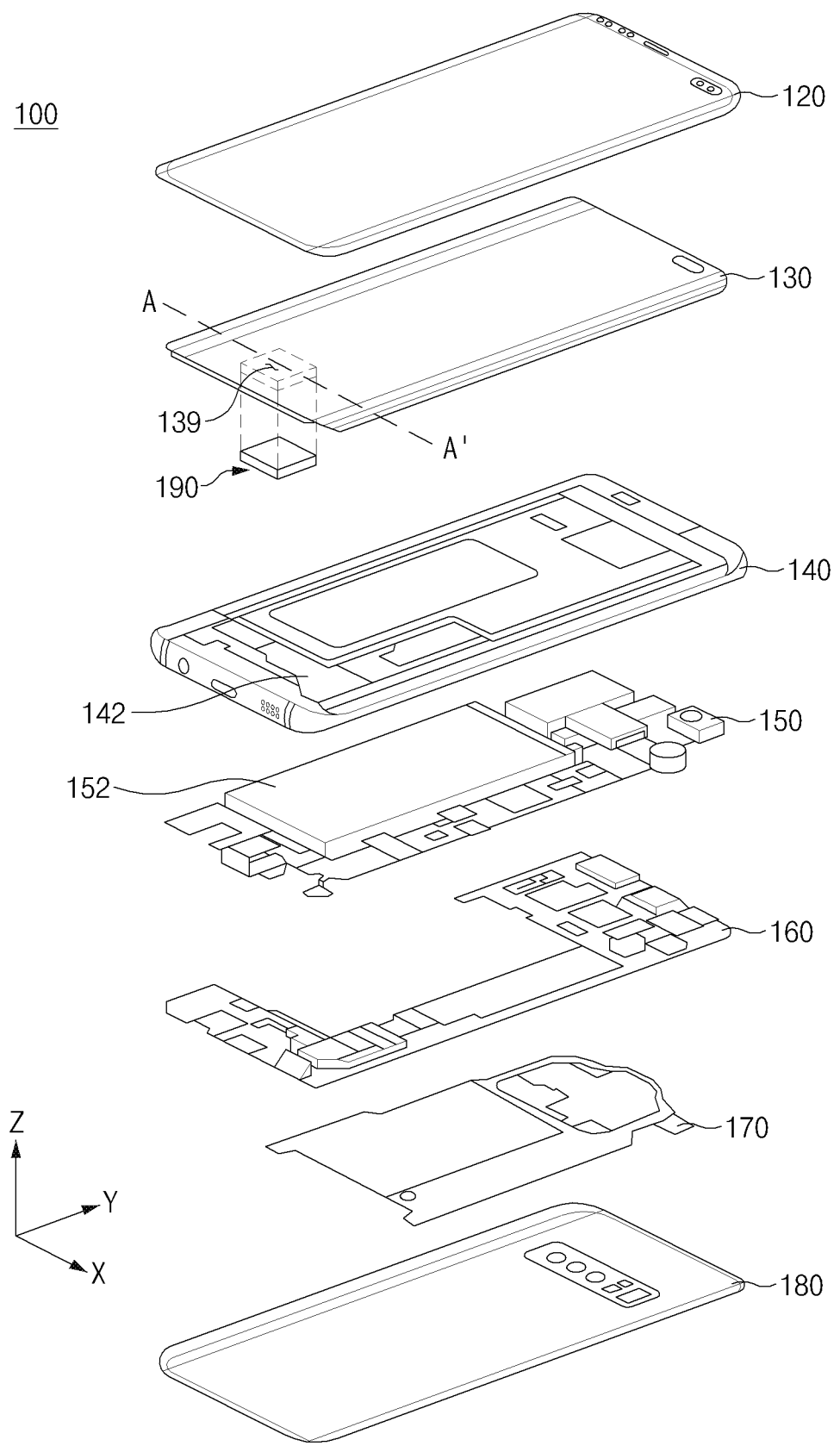
FIG. 3 is an exploded perspective view of the electronic device illustrated in FIG. 1, according to an embodiment.

FIG. 3 is an exploded perspective view of the electronic device illustrated in FIG. 1, according to an embodiment.

Referring to FIG. 3, the electronic device 100 includes a side member 140, a first support member 142 (e.g., a bracket), a front plate 120, a display 130, a printed circuit board 150, a battery 152, a second support member 160 (e.g., a rear case), an antenna 170, and a rear plate 180. The electronic device 100 may not include at least one of the components (e.g., the first support member 142 or the second support member 160) or may further include other components. At least one of the components included in FIG. 3 may be identical or similar to at least one of the components included in FIG. 1 or 2, and thus, additional descriptions will be omitted to avoid redundancy.

The first support member 142 may be disposed within the electronic device 100 and may be connected with the side member 140, or may be integrally formed with the side member 140. The first support member 142 may be formed of, for example, a metal material and/or a nonmetal material (e.g., a polymer material or a ceramic material). The display 130 may be coupled to one surface of the first support member 142, and the printed circuit board 150 may be coupled to an opposite surface of the substrate 130. A processor, a memory, and/or an interface may be mounted on the printed circuit board 150. The processor may include one or more of a central processing unit, an application processor, a graphic processing device, an image signal processor, a sensor hub processor, or a communication processor.

The memory may include, for example, a volatile memory or a nonvolatile memory.

The interface may include, for example, a high definition multimedia interface (HDMI), a USB interface, a secure digital (SD) card interface, and/or an audio interface. The interface may electrically or physically connect, for example, the electronic device 100 to an external electronic device and may include a USB connector, an SD card/ multimedia card (MMC) connector, or an audio connector.

The battery 152 may be a device for supplying power to at least one component of the electronic device 100 and may include, for example, a primary cell incapable of being recharged, a secondary cell that is rechargeable, and/or a fuel cell. For example, at least part of the battery 152 may be disposed on substantially the same plane as the printed circuit board 150. The battery 152 may be integrally disposed within the electronic device 100, or may be disposed to be removable from the electronic device 100.

The antenna 170 may be interposed between the rear plate 180 and the battery 152. The antenna 170 may include, for example, a near field communication (NFC) antenna, an antenna for wireless charging, and/or a magnetic secure transmission (MST) antenna. For example, the antenna 170 may perform short range communication with an external device or may wirelessly transmit/receive power necessary for charging. An antenna structure may be implemented with a portion of the side member 140 and/or the first support member 142, or with a combination thereof.

The electronic device 100 may further include a sensor 190 coupled to the display 130. At least part of the sensor 190 may be disposed in the recess 139 formed on the rear surface of the display 130. The sensor 190 may be formed in a sensing region 110F on a part of the first plate 120.

Various mounting examples of the sensor 190 may be described with reference to FIGS. 4A to 4D. The mounting structure described with reference to FIGS. 4A to 4D is an example, and embodiments of the disclosure are not limited thereto. An embodiment of the disclosure may be identically applied to the electronic device 100 including the arbitrary sensor 190 positioned on the rear surface of the display 130 to obtain data through at least part of the display 130.

Figure 4A:
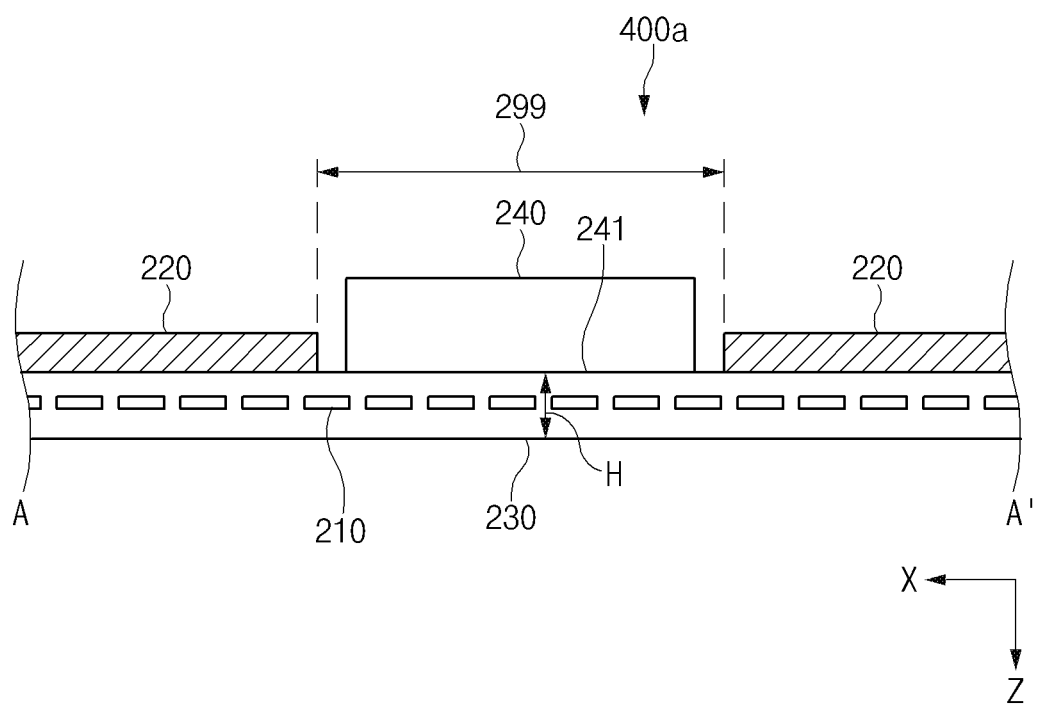
FIG. 4A is a cross-sectional view of a display of an electronic device, according to an embodiment.

FIG. 4A is a cross-sectional view 400a of a display of an electronic device, according to an embodiment. FIG. 4A is a cross-sectional view of the electronic device 100 taken along line A-A' illustrated in FIG. 3.

A display 130 may include a plurality of layers. The display 130 may include a first layer 210 (e.g., a display panel) including a plurality of pixels, a cover layer 230 disposed on a front surface (e.g., +z axis direction) of the first layer 210, and a second layer 220 disposed on the rear surface (e.g., −z axis direction) of the first layer 210. For example, the sensor 240 may be coupled to the rear surface of the first layer 210.

The first layer 210 may include a first surface facing the first direction (e.g., +z axis direction) and a second surface facing the second direction (e.g., −z axis direction) opposite to the first direction. The first direction may be the direction facing the front surface of the electronic device 100 (e.g., the direction facing the first plate 120 of FIG. 3). The second direction may be a direction facing the rear surface (e.g., the direction facing the second plate 180 of FIG. 3) of the electronic device 100. The first layer 210 may include a plurality of pixels arranged to emit light in the first direction. The first layer 210 may include a pixel layer including a plurality of pixels. The pixel layer may be formed in a screen display region on the first plate 120 or the front surface of the electronic device 100. The first layer 210 may further include a touch layer including a plurality of touch sensors.

The cover layer 230 may form at least part of the first plate 120. Alternatively, at least part of the cover layer 230 may form the first surface 110A of the housing 110 or may form the surface of the electronic device 100.

The cover layer 230 may be formed transparently. The cover layer 230 may include a transparent material. The cover layer 230 may be made of various materials. For example, the cover layer 230 may be a material of glass or a polymer (e.g., polyimide (PI) or polyethylene terephthalate (PET)).

The screen display region (e.g., an active area) may be formed on the cover layer 230 by the first layer 210 disposed in the second direction (e.g., −z axis direction) from the cover layer 230. In addition, a sensing region where the electronic device may obtain information about an external object may be formed in the part of the cover layer 230 by the sensor 240. When an external object contacts the region of the cover layer 230 corresponding to the sensing region, the sensor 240 may obtain information about the external object. The sensing region and the screen display region may be formed to at least partially overlap with each other. The electronic device 100 may display a screen through the sensing region, using at least one pixel and may sense information about the external object through the sensing region.

The second layer 220 may include a plurality of layers. For example, the second layer 220 may include at least one shielding layer. The at least one shielding layer may mean a layer providing optical and/or electrical shielding for the first layer 210. In the case of optical shielding, as the light introduced from the outside of the electronic device is blocked from the shielding layer, it is possible to block a user from watching the inside of the electronic device 100. In the case of electrical shielding, an electric field capable of being generated from the inside/outside the electronic device 100 may be blocked through a shielding layer, and it is possible to prevent electronic elements inside the electronic device 100 from being affected. The second layer 220 may include a buffer layer (e.g., a cushion layer) for alleviating the internal or external impact of the electronic device 100 delivered to the display or absorbing the impact. The buffer layer may be a black embo layer (e.g., a black layer including an uneven pattern). The second layer 220 may include a black polymer layer providing the optical shielding. The second layer 220 may include a layer for the electrical shielding and/or heat dissipation of the display. The second layer 220 may include a copper sheet. The second layer 220 may further include additional various layers.

The display may further include a protection film (PF). For example, a protective film may be interposed between the first layer 210 and the second layer 220 to protect the first layer 210. The protective film may be included in the first layer 210. The display may further include a bonding layer for bonding the layers. The bonding layer may be made of a transparent material and may bond each of the layers to be implemented as a single display module.

The second layer 220 may include an opening 299. When the display module 200 is viewed in the +z axis direction, the opening 299 may be formed in various forms (e.g., a rectangle, a square, a circle, or an oval). The opening 299 may have a shape corresponding to the combination of various shapes. The opening 299 may be formed to penetrate the second layer 220 when viewed in the second direction (e.g., −z axis direction). The opening 299 may be referred to as a recess formed on one surface of the display.

The sensor 240 may include a first surface 241 disposed to face the first panel 210. The first surface 241 may be referred to as the top surface of the sensor 240 or the sensor surface of the sensor 240. The sensor 240 disclosed may be implemented in various sensing schemes. The sensor 240 may include an optical sensor, a laser sensor or an ultrasonic sensor. The ultrasonic sensor may be configured to obtain biometric information (e.g., a fingerprint structure) of a user using ultrasonic waves having a predetermined frequency. The optical sensor may obtain the light reflected from the object external by the light inside the electronic device and then obtain the user's biometric information based on the obtained reflection light. For example, the first surface 241 may be mounted to face the rear surface of the first layer 210 or the protective film of the first layer 210.

The sensor 240 may transmit, receive, and/or sense a signal (e.g., an optical signal or an ultrasonic signal). The signal may pass through the medium portion H formed by at least part of the display layer (e.g., the first layer 210 and the cover layer 230) of a display from the sensor 240 and then may be propagated toward an external object (e.g., the fingerprint of a finger). At least part of the signal reflected by the external object may again pass through the medium H and then may be received by the sensor 240. The signal may be emitted from at least part of the first layer 210. Moreover, the signal reflected by at least part of the external object may pass through the medium "H" to be received by the sensor 240.

Figure 4B:
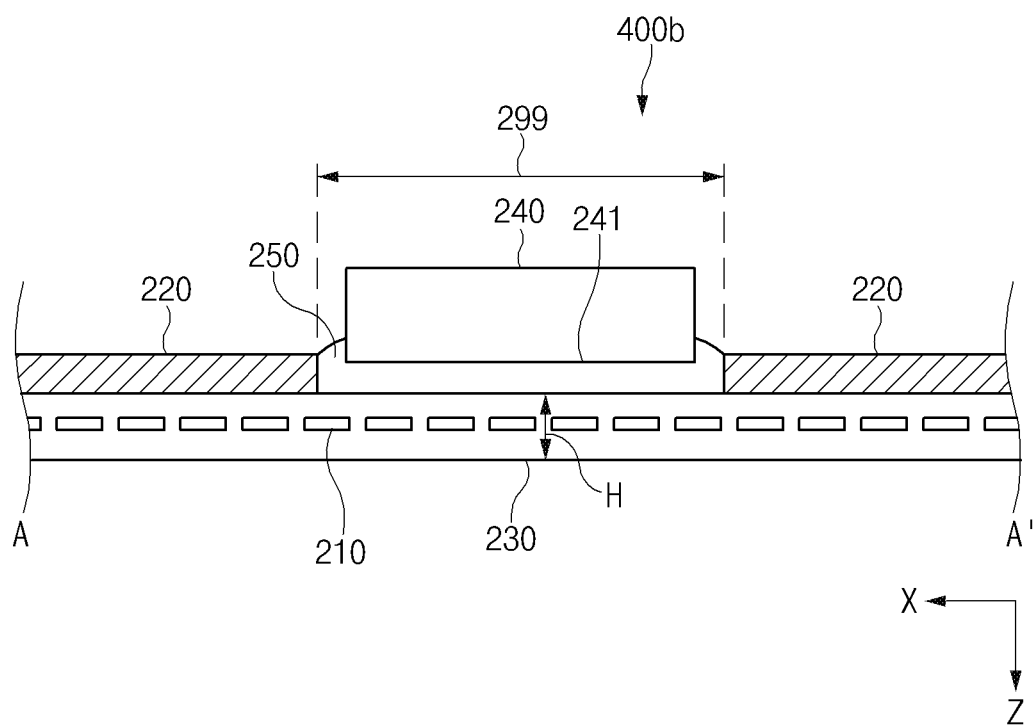
FIG. 4B is a cross-sectional view of a display of an electronic device, according to an embodiment.

FIG. 4B is a cross-sectional view of a display of an electronic device, according to an embodiment. FIG. 4B is a cross-sectional view of the electronic device 100 taken along line A-A' illustrated in FIG. 3.

The description associated with the display of FIG. 4B may be referenced by the description associated with FIG. 4A. Unless otherwise described, the description of FIG. 4A may be identically applied to the description of FIG. 4B.

Referring to FIG. 4B, the first surface 241 of the sensor 240 may be mounted to face the rear surface of the first layer 210 or the protective film of the first layer 210. The sensor 240 may be attached to the first layer 210 through an adhesive member 250. When the sensor 240 is an optical sensor, the adhesive member 250 may be a transparent adhesive member configured to have a specified refractive index. When the sensor 240 is an ultrasonic sensor, the adhesive member 250 may be adjusted to have the specified refractive index during ultrasonic transmission such that the loss of ultrasonic waves is reduced. The adhesive member 250 may be formed of an ultrasonically-tuned (e.g., acoustic impedance matched) opaque (e.g., black) adhesive member. The acoustic impedance matching may be made to extract a signal very sensitively when the frequency of the signal varies depending on a medium. The efficiency of ultrasonic signal transmission may be increased through the impedance matching.

Figure 4C:
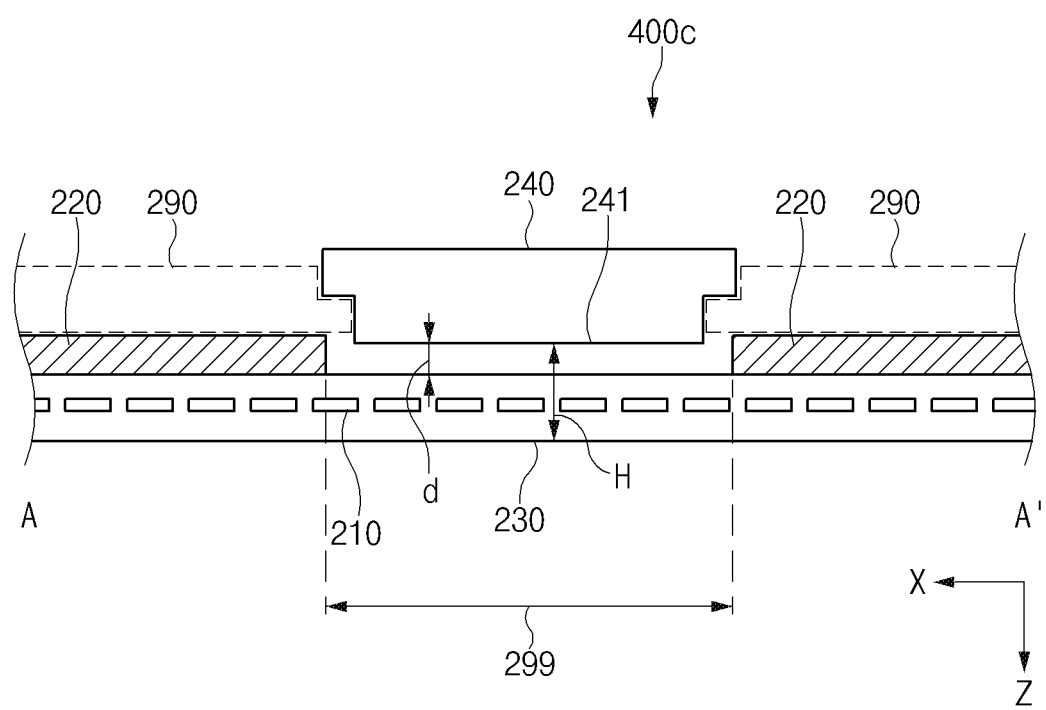
FIG. 4C is a cross-sectional view of a display of an electronic device, according to an embodiment.

FIG. 4C is a cross-sectional view of a display of an electronic device, according to an embodiment. FIG. 4C is a cross-sectional view of the electronic device 100 taken along line A-A' illustrated in FIG. 3.

The description associated with the display of FIG. 4C may be referenced by the descriptions associated with FIGS. 4A and 4B. Unless otherwise described, the descriptions of FIGS. 4A and 4B may be identically applied to the description of FIG. 4C.

Referring to FIG. 4C, the first surface 241 of the sensor 240 may be mounted to face the rear surface of the first layer 210 or the protective film of the first layer 210. The sensor 240 may be mounted such that the first surface 241 is spaced from the rear surface of the first layer 210 by a specified spaced distance d. In this case, the sensor 240 may be fixed to a separate support member 290. The sensor 240 may be an optical sensor capable of sensing information corresponding to an external object based on optical information. When the sensor 240 is implemented with an optical sensor, the electronic device may emit light to an object outside the electronic device and then may obtain at least part of the light reflected by the external object through the sensor 240. The electronic device may secure biometric information about the external object, using the obtained light. The sensor 240 may be implemented with an ultrasonic sensor. When the sensor 240 is implemented with an ultrasonic sensor, a material (e.g., the adhesive member 250 of FIG. 4B) capable of transmitting an ultrasonic signal may be disposed in a space corresponding to the spaced distance d between the first surface 241 and the first layer 210 of the sensor 240.

The sensor 240 may transmit, receive, and/or sense a signal (e.g., an optical signal or an ultrasonic signal). The signal may pass through at least part of the layers (e.g., the first layer 210 and the cover layer 230) of a display and the medium portion H formed by the spaced distance d from the sensor 240 and then propagated toward an external object (e.g., the fingerprint of a finger). At least part of the signal reflected by the external object may again pass through the medium H and then received by the sensor 240. The sensor 240 itself may not transmit a signal. The electronic device may separately include a light emitting device (e.g., at least one pixel) capable of emitting light or a separate ultrasound emitting device capable of emitting ultrasonic waves. The sensor 240 may detect information of an external object, using the light emitted by the light emitting element of an electronic device.

The signal may pass through the first layer 210 and then may be emitted to the outside of the electronic device; moreover, the signal reflected by at least part of the external object may pass through the medium H to be received by the sensor 240.

Figure 4D:
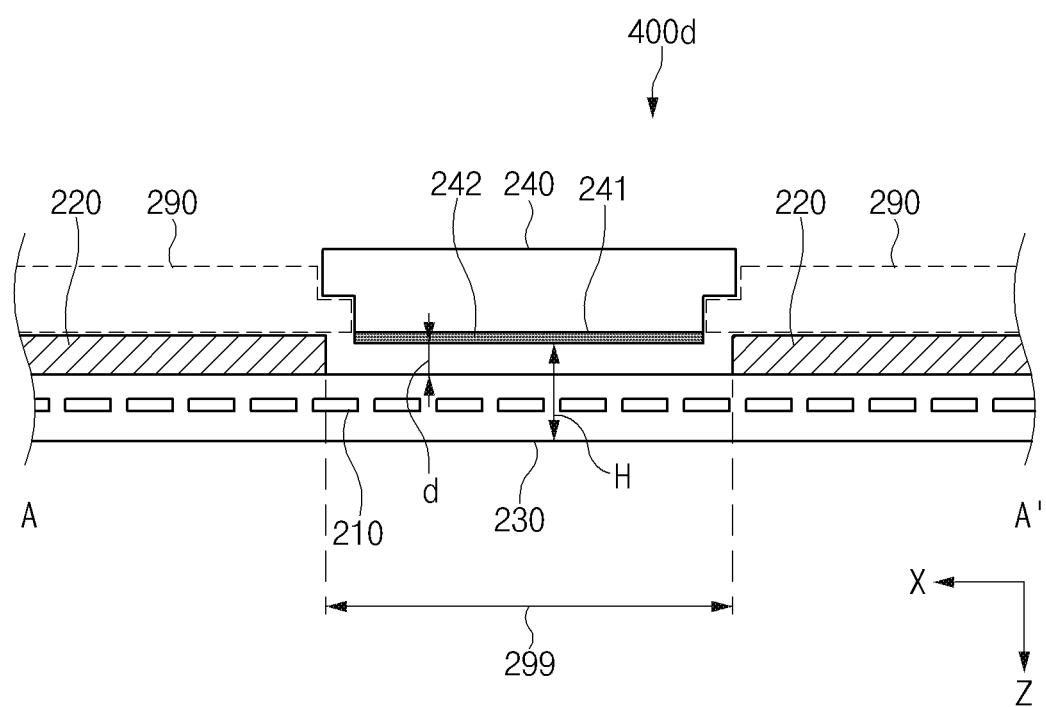
FIG. 4D is a cross-sectional view of a display of an electronic device, according to an embodiment.

FIG. 4D is a cross-sectional view of a display of an electronic device, according to an embodiment. FIG. 4D is a cross-sectional view of the electronic device 100 taken along line A-A' illustrated in FIG. 3.

The description associated with the display of FIG. 4D may be referenced by the descriptions associated with FIGS. 4A, 4B, and 4C. Unless otherwise described, the descriptions of FIGS. 4A, 4B, and 4C may be identically applied to the description of FIG. 4D.

With regard to FIGS. 4A to 4C, the first surface 241 of the sensor 240 is described as the top surface of the sensor 240, but embodiments of the disclosure are not limited thereto.

Referring to FIG. 4D, the sensor 240 may further include an upper layer 242 positioned on the first surface 241 (e.g., a sensor surface). The upper layer 242 may include an IR cut-off filter (e.g., an IR cut filter) of the sensor 240, a protective film, and/or a lens. To sense the visible light of the human-visible wavelength between 380 and 770 nanometer (nm) in the sensor, the IR cut-off filter may be disposed to block human-invisible IR regions of 770 nm or more.

The medium H may include at least part of the display layer (e.g., the first layer 210 or the cover layer 230) of a display, the spaced distance d and the upper layer 242.

Figure 5:
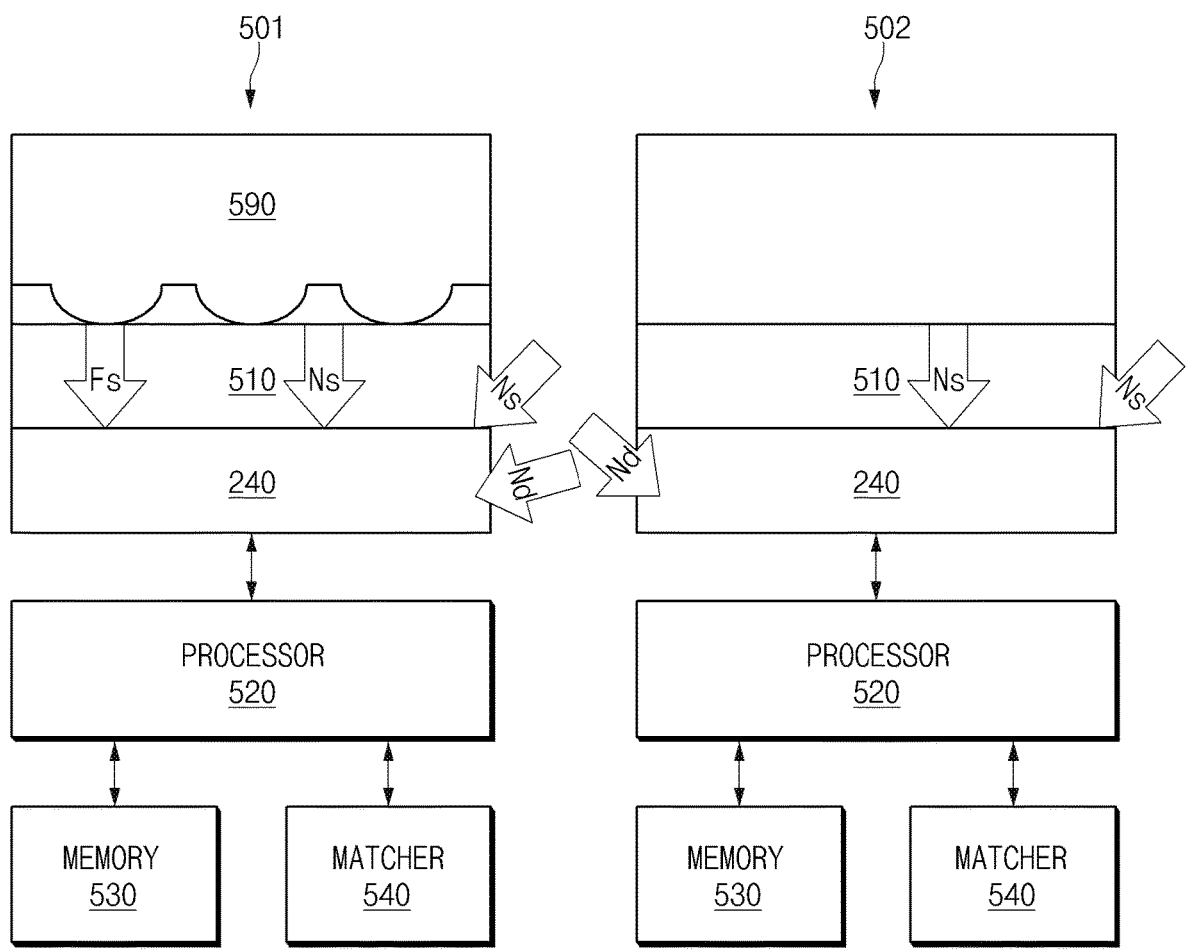
FIG. 5 illustrates a method of obtaining an image, according to an embodiment.
Figure 6:
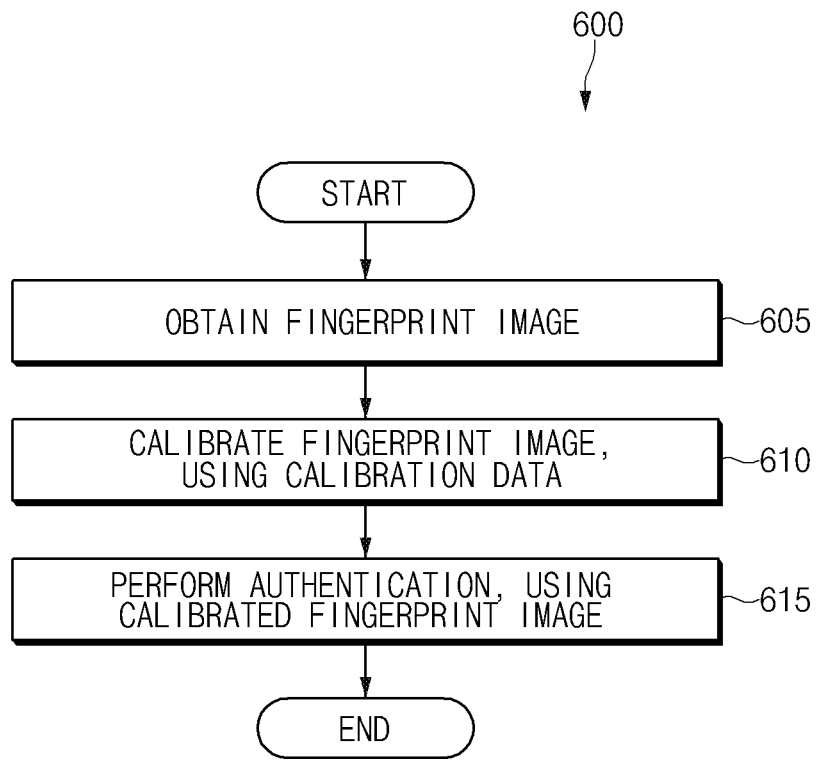
FIG. 6 is a flowchart of an authentication method, according to an embodiment.

FIG. 5 illustrates a method of obtaining an image, according to an embodiment. FIG. 6 is a flowchart of an authentication method, according to an embodiment.

Referring to FIG. 5 and with reference to reference numeral 501, the sensor 240 may obtain at least part of signals corresponding to an external object 590 (e.g., a finger) passing through a medium 510. The processor 520 may obtain at least part of signals corresponding to an external object 590, using the sensor 240. The sensor 240 may receive the static noise generated by the medium 510 as well as a fingerprint signal Fs reflected by the external object 590. For example, in the static noise Ns, the noise generated while the fingerprint signal Fs passes through the medium 510 and at least part of signals reflected by the sensor 240 or a display panel may be reflected. The reflected signal may operate as a noise. In addition, the static noise Ns may include the signal reflected by another configuration (e.g., different electrical elements, another housing, and other instrument structures) of an electronic device 100. The sensor 240 may receive dynamic noise Nd as well as static noise Ns. The dynamic noise Nd may include the dynamic noise received from the inside or outside of the electronic device 100. For example, the dynamic noise Nd may include the noise according to operations of the internal components (e.g., a wired/wireless charging circuit, a communication circuit, a display, a digitizer, a stylus, and/or an audio circuit) of the electronic device 100. The dynamic noise Nd may include the noise (e.g., an external wireless charging signal, external light, and/or external electromagnetic waves) received from the outside of the electronic device 100. The dynamic noise Nd may include the thermal noise caused by temperature change of the electronic device 100, the noise introduced into the sensor 240 depending on the movement of the electronic device 100, the noise according to the charging of the electronic device 100, and/or the noise from the unstable ground or power of the electronic device 100. The noise may include the noise received by not only a sensing unit but also an interface connecting to another component (e.g., the processor 520) different from the sensor 240.

The types of noise disclosed in the specification are exemplary, and it is understood that the static noise Ns is the noise associated with the structure of the electronic device 100 and the variation of the static noise Ns is smaller than that of the dynamic noise Nd. The dynamic noise Nd may refer to a noise signal introduced from an internal component or outside of the electronic device 100 to the sensor 240 and may mean the noise having the relatively large variation compared to the static noise Ns. The above-described noises may reduce the fingerprint recognition rate of the electronic device 100. To reduce the effect on the fingerprint recognition performance, the electronic device 100 may use calibration data for calibrating a fingerprint image.

The processor 520 may perform user authentication or user identification on information (e.g., a fingerprint image) of the external object 590 obtained using the sensor 240 and/or using a matcher 540. For example, the matcher 540 may be a component operating in the security region of the electronic device 100. The matcher 540 may be a software module operating in a secure memory implemented independently of the memory 530 of the electronic device 100. At least part of the matcher 540 may be implemented by the security hardware configuration (e.g., a secure element) of the electronic device 100. The matcher 540 may store information of the external object 590 received from the processor 520, in a secure memory region. The matcher 540 may perform user authentication or identification by comparing the information of the external object 590 received from the processor 520 with information (e.g., a fingerprint image) stored in the secure memory region and then may deliver the performed result to the processor 520. When the processor 520 identifies or authenticates the external object 590 by using the matcher 540, the identification or authentication may fail due to the dynamic noise Nd and the static noise Ns. To remove the dynamic noise Nd and the static noise Ns, the processor 520 may remove noise components from information (e.g., a fingerprint image) of the external object 590 obtained by the sensor 240, using a background image stored in the memory 530. For example, the processor 520 may calibrate the information of the external object 590, using the background image and may deliver the calibrated information of the external object 590 to the matcher 540. The matcher 540 may perform user authentication or identification, using the calibrated information of the external object 590.

Referring to reference numeral 502 of FIG. 5, the processor 520 may obtain the background image, using the sensor 240. The processor 520 may obtain the background image by obtaining an image using the sensor 240 in a state where the external object 240 is not placed (e.g., when a user's finger is not positioned on the electronic device 100). The processor 520 may store the obtained background image in the memory 530. In this case, the background image obtained by the sensor 240 may include the dynamic noise Nd as well as the static noise Ns. When the electronic device 100 generates calibration data by using a background image including the dynamic noise Nd, the calibration data may include the dynamic noise Nd having a large variation. When the electronic device 100 performs calibration using data including the dynamic noise having a large variation, the performance of fingerprint recognition may deteriorate. The dynamic noise Nd included in the calibration data using the background image may be different from the dynamic noise Nd introduced upon obtaining a fingerprint. When dynamic noise components included in the background image are removed from the fingerprint image (which is obtained whenever a fingerprint is recognized) while being calibrated, even though dynamic noise components are not actually introduced, the dynamic noise components may be removed. Because the dynamic noise is continuously removed, side effects such as repeatedly introducing dynamic noise components may occur. Accordingly, when calibration data is generated based on the background image including the dynamic noise Nd, the same result as introducing the dynamic noise Nd whenever a fingerprint image is calibrated may occur. Thus, the electronic device 100 may calibrate an accurate fingerprint image by preventing the dynamic noise from being introduced into the calibration data.

FIG. 6 is a flowchart of an authentication method 600, according to an embodiment.

Referring to FIG. 6, in step 605, an electronic device 100 obtains a fingerprint image (e.g., fingerprint data corresponding to a fingerprint image), using the sensor 240. For example, the electronic device 100 may obtain a fingerprint image based on a user input or based on a user authentication request of an application. The electronic device 100 may obtain a fingerprint image by using a sensor 240 using calibration data.

In step 610, the electronic device 100 calibrates the fingerprint image, using the calibration data. For example, calibrating the fingerprint image may include calibrating pieces of image data corresponding to the fingerprint image obtained by the sensor, using the calibration data generated based on the background image 502. The electronic device 100 may generate the calibration data based on the background image 502.

The electronic device 100 may obtain a noise component capable of being introduced through a background image 502 when the sensor 240 obtains the fingerprint signal Fs and may use the corresponding noise component as the calibration data. The electronic device 100 may obtain the calibrated fingerprint image by removing noise components indicated by the calibration data from the received fingerprint image. The electronic device 100 may have (e.g., store) the calibration data, including the at least one static noise Ns, by default. However, the electronic device 100 may not have the calibration data for all conditions (e.g., temperature). The static noise Ns may also be changed depending on changes (e.g., scratches or cracks on the surface of a display) in the structure of the electronic device 100. Accordingly, the electronic device 100 may newly generate the calibration data. For example, the electronic device 100 may obtain a background image 502 for generating calibration data.

In step 615, the electronic device 100 performs authentication on a user, using the calibrated fingerprint image (or calibrated fingerprint data). The calibrated fingerprint image may include an image, from which the noise is removed, to improve the performance for fingerprint authentication. The electronic device may authenticate the user's fingerprint using the user's biometric information (e.g., information corresponding to a fingerprint), using the calibrated fingerprint image.

Figure 7:
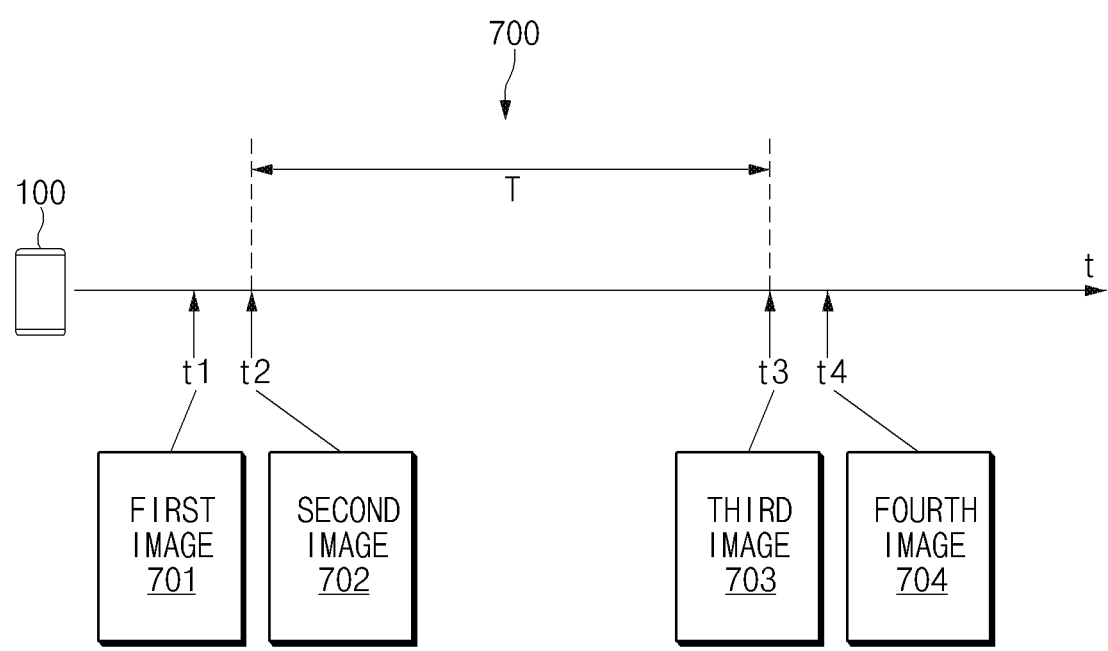
FIG. 7 illustrates a process of obtaining a background image, according to an embodiment.

FIG. 7 illustrates a process 700 of obtaining a background image, according to an embodiment.

The electronic device 100 may generate calibration data using a plurality of background images. For example, the electronic device 100 may obtain a plurality of background images and may generate calibration data, using at least part of the plurality of background images. Because the variation in dynamic noise is greater than the variation in static noise, when the plurality of background images are collected continuously (e.g., within a specified short time interval), the variation between the plurality of background images including the dynamic noise may be increased.

The electronic device 100 may estimate the amount of dynamic noise introduced into the background image based on the variation between the plurality of background images. For example, the electronic device 100 may determine the amount of dynamic noise based on the variance or standard deviation between the plurality of background images. The electronic device 100 may determine the amount of dynamic noise introduced into the plurality of background images by averaging the standard deviations of pixels between the plurality of background images. For example, when using two background images, the electronic device 100 may calculate the standard deviation between the first pixel of the first background image and the first pixel of the second background image. Similarly, the electronic device 100 may calculate the standard deviation for all pixels of the first background image and the second background image and then may determine the amount of dynamic noise based on the sum of standard deviations for all pixels or the average of the standard deviations (e.g., a value derived by dividing the sum by the number of pixels). For example, the electronic device 100 may obtain the magnitude of the dynamic noise Nd based on Equation (1), below.

$$Nd = \frac{1}{M} \sum_{i=1}^{M} \sqrt{\frac{1}{N} \left( \sum_{j=1}^{N} P_{j,i} - \frac{\sum_{k=1}^{N} P_{k,i}}{N} \right)^2} \quad (1)$$

In Equation (1), above, $P_{n,m}$ may denote the value of the m-th pixel of the n-th background image; N may denote the number of background images; M may denote the number of pixels included in a single background image. Equation (1) above is an exemplary index indicating the level of dynamic noise, and embodiments of the disclosure are not limited thereto. For example, the electronic device 100 may determine the amount of dynamic noise depending on the equation obtained by modifying Equation (1) or by a method of quantifying the variation between other N background images.

When the amount of dynamic noise is less than a specified value, the electronic device 100 may determine that the noise of a reliable level is introduced. The electronic device may generate calibration data, using at least one of the background images. When the amount of dynamic noise is greater than or equal to the specified value, the electronic device 100 may determine that the noise of an abnormal level is introduced, discard a background image, and abort the generation of the calibration data.

The specified value may be a preset value. The specified value may be an experimentally-determined value within a range in which the performance of the sensor 240 of the electronic device 100 is not affected. The specified value for the amount of dynamic noise may be a value pre-stored in the electronic device 100 or may be adjusted by a network. The electronic device 100 may change the specified value for the amount of dynamic noise depending on internal environmental information or status information. For example, accuracy may be increased by changing the specified value based on information about time, temperature, humidity, or locations.

Referring to FIG. 7, the electronic device 100 may use two background images upon generating the calibration data. Using two background images is exemplary, and the electronic device 100 may use more than two background images.

The electronic device 100 may obtain a first image 701 (e.g., a first background image) at time t1 and may obtain a second image 702 (e.g., a second background image) at time t2. The electronic device 100 may obtain the second image 702 immediately after obtaining the first image 701. The time interval between the time t1 and time t2 may correspond to the time when the electronic device 100 obtains a single background image. To prevent the dynamic noise according to the change in the external environment of the electronic device 100 from being introduced, the time interval between time t1 and time t2 may be set to be shorter than the specified time. For example, the first image may be obtained at time t1, and then the second image may be obtained at time t2 after about 1 second. The time interval may be changed dynamically or may be changed based on the value adjusted by an electronic device or based on a factor outside the electronic device.

The electronic device 100 may determine the amount of dynamic noise based on the variation between the first image 701 and the second image 702. The electronic device may determine the variation based on the data included in the first image and the second image and may determine the amount of dynamic noise based on the variation. For example, when the variation is small, the electronic device may determine that the amount of dynamic noise is small in response to the variation. When the amount of dynamic noise is small, the electronic device may determine that reliability is secured, and may use at least one of the obtained images as image calibration data. When the amount of dynamic noise is less than a preset amount, the electronic device 100 may generate calibration data, using at least one of the first image 701 or the second image 702. The electronic device 100 may generate the calibration data, using the first image 701, using the second image 702, using an average of the first image 701 and second image 702, or using a combination of the first image 701 and the second image 702. When generating the calibration data, the electronic device 100 may store the generated calibration data in the memory of the electronic device 100. The electronic device 100 may calibrate the fingerprint image (e.g., fingerprint data), using the calibration data stored in the memory (e.g., step 610 of FIG. 6).

The electronic device 100 may be configured to update calibration data at a specified period. The static noise of the electronic device 100 may also be changed over time. The electronic device 100 may update calibration data at a specified period T to generate the calibration data based on the change in static noise.

The electronic device 100 may obtain at least one image at time t1 and time t2; after the specific period T elapses, the electronic device 100 may obtain a third image 703 (e.g., a third background image) at time t3 and then may obtain a fourth image 704 (e.g., a fourth background image) at time t4. The variation (e.g., the amount of static noise) between the third image 703 and the fourth image 704 may not be less than a specified value. In this case, the electronic device 100 may discard the third image 703 and the fourth image 704 and may abort a procedure of generating the calibration data. The specified period T may include a specified period stored in the electronic device or may be dynamically changed by the electronic device.

Figure 8:
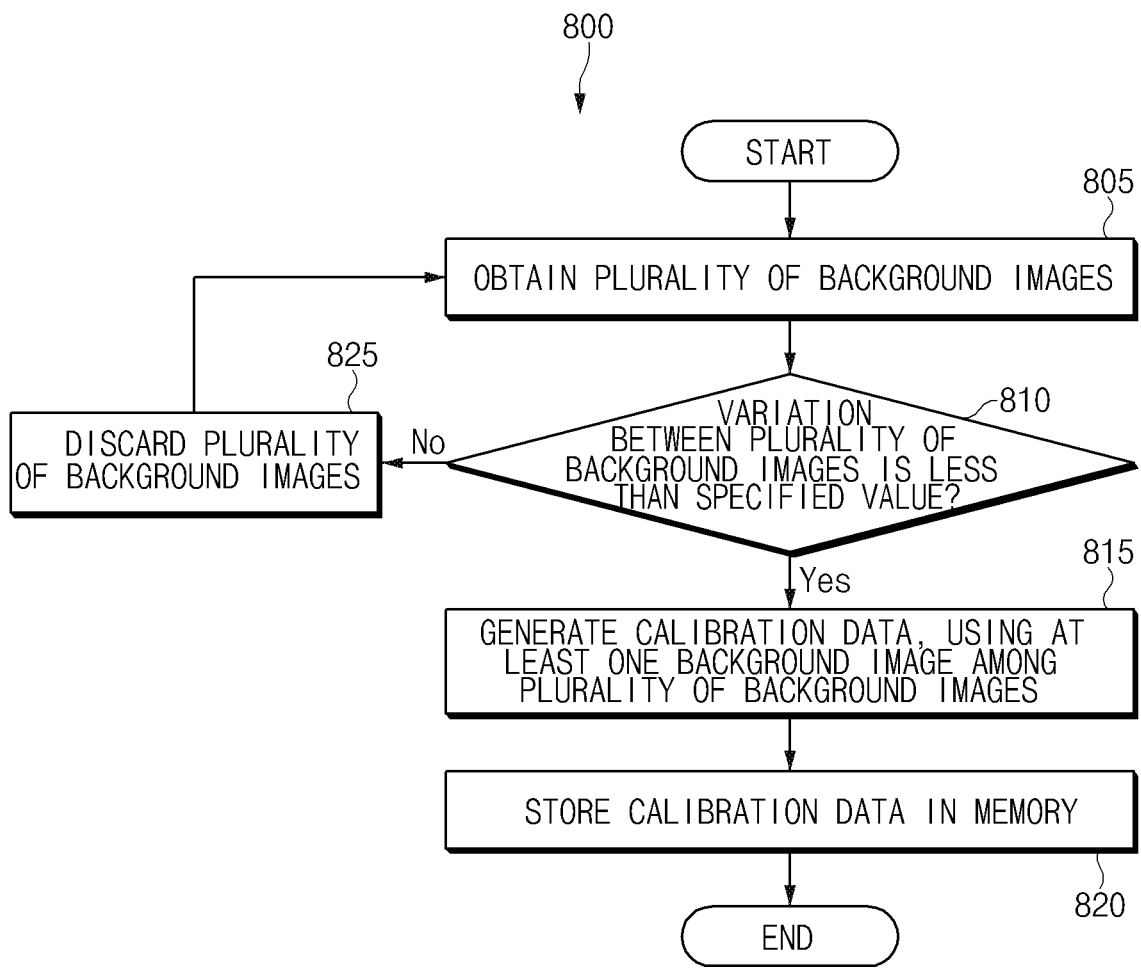
FIG. 8 is a flowchart of a method for obtaining calibration data, according to an embodiment.

FIG. 8 is a flowchart 800 of a method for obtaining calibration data, according to an embodiment.

In step 805, an electronic device 100 obtains a plurality of background images, using a sensor 190. The electronic device 100 may continuously obtain the plurality of background images, or the electronic device 100 may obtain the plurality of background images within a specified time interval. The electronic device 100 may obtain the plurality of background images based on a specified period or a specified time, or based on specific conditions or situations. For example, the electronic device 100 may obtain the plurality of background images periodically after a specific period has passed since power was applied; alternatively, when the application operating in the electronic device 100 is an application necessary for fingerprint authentication, the electronic device 100 may obtain the plurality of background images. When there is a change in temperature, time, and location of the electronic device 100, the electronic device 100 may obtain the plurality of background images.

The electronic device 100 may obtain a background image based on hovering information of the display. For example, when it is determined that an object being hovered is distant, the electronic device 100 may obtain a background image. When an external object is not detected on the display of the electronic device 100 or when an external object is not detected in the sensing region 110F of the electronic device 100, the electronic device 100 may obtain the plurality of background images. The electronic device 100 may obtain background images based on the state of the electronic device 100. For example, when the electronic device 100 is being charged, the electronic device 100 may obtain background images, or when the display of the electronic device 100 does not display an image, the electronic device 100 may obtain background images. Alternatively, when the communication circuit is not transmitting or receiving data, the electronic device 100 may obtain background images.

In step 810, the electronic device 100 determines whether the variation between a plurality of background images is less than a specified value. The electronic device 100 may determine the variation (e.g., the amount of dynamic noise) based on the variance or standard deviation between the plurality of background images. The electronic device 100 may determine the variation between the plurality of background images by averaging standard deviations of pixels between the plurality of background images. The electronic device 100 may determine that the magnitude of the dynamic noise Nd of Equation (1) is the variation.

When the variation is less than the specified value (Yes in step 810), in step 815, the electronic device 100 generates calibration data, using at least one background image among the plurality of background images. The electronic device 100 may generate the calibration data, using one of the plurality of background images or using two or more images among the plurality of background images by averaging or combining the two or more images. In the step of selecting one or more of the plurality of background images, the electronic device may select one or more of the plurality of background images based on specific information of the plurality of background images. For example, the electronic device may select an image having the smallest variation among the plurality of background images or the smallest exposure value among the plurality of background images. The method of selecting a background image among the plurality of background images is not limited to the described content, and it is possible to select a background image capable of securing optimal calibration data, using various methods.

In step 820, the electronic device 100 stores the generated calibration data in the memory of the electronic device 100. When performing fingerprint recognition, the electronic device 100 may calibrate the fingerprint image obtained using the sensor 240, using the calibration data stored in the memory and then may perform authentication using the calibrated fingerprint image.

When the variation is greater than or equal to the specified value (No in step 810), in step 825, the electronic device 100 discards the plurality of background images and obtains the plurality of background images again in step 805. The electronic device 100 may perform step 805 again after a specified period.

Figure 9:
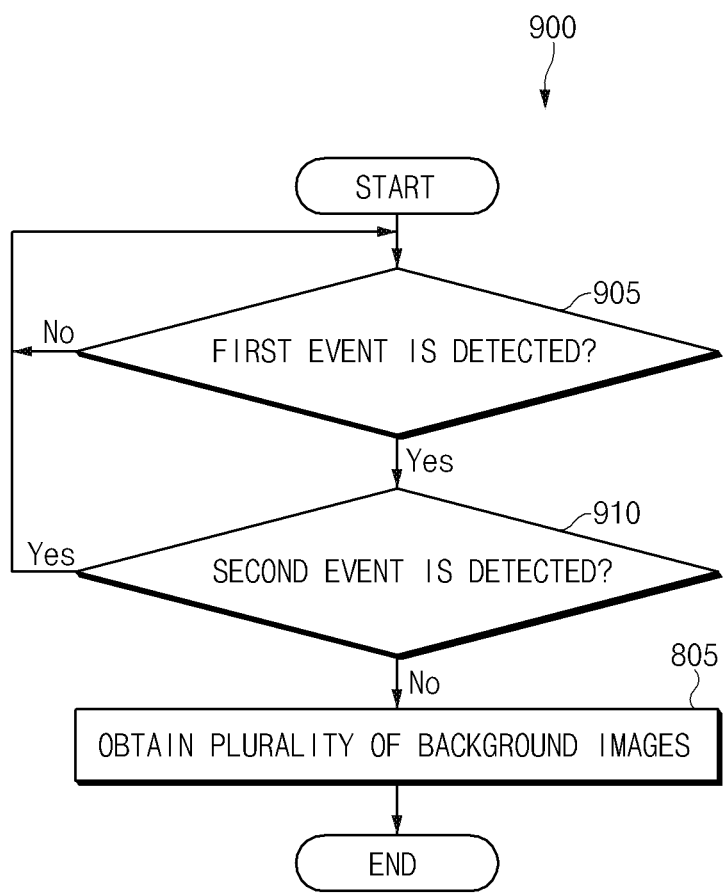
FIG. 9 is a flowchart of a method of obtaining a background image, according to an embodiment.

FIG. 9 is a flowchart 900 of a method of obtaining a background image, according to an embodiment.

In step 905, the electronic device 100 may determine whether a first event is detected. The first event may be a condition of triggering the acquisition of a specified background image (e.g., the generation of calibration data). The first event may be detected when the electronic device 100 reaches a temperature in a specified range (e.g., a temperature in a range in which calibration data is not generated) and when a specified period elapses after the calibration data is generated.

When the first event is detected (Yes in step 905), in step 910, the electronic device 100 determines whether the second event is detected. The second event may be a condition of preventing a background image from being obtained, which may include a second event that an external object is detected in the display or sensing region 110F of the electronic device 100. The second event may be to prevent the background image from being obtained when the electronic device 100 uses hovering information with respect to the external object and the external object approaches the electronic device 100 within a specific distance. The electronic device 100 may determine that the second event occurs, using the illuminance sensor of the electronic device 100 when a specific illuminance value or more is reached. When being placed at a very bright place, the electronic device 100 may determine that the second event occurs and then may not obtain a background image.

When the second event is not detected (No at step 910), the electronic device 100 obtains the plurality of background images in step 805. When the first event is not detected (No in step 905) or the second event is detected (Yes in step 910), the electronic device 100 monitors for the occurrence of the first event.

Figure 10:
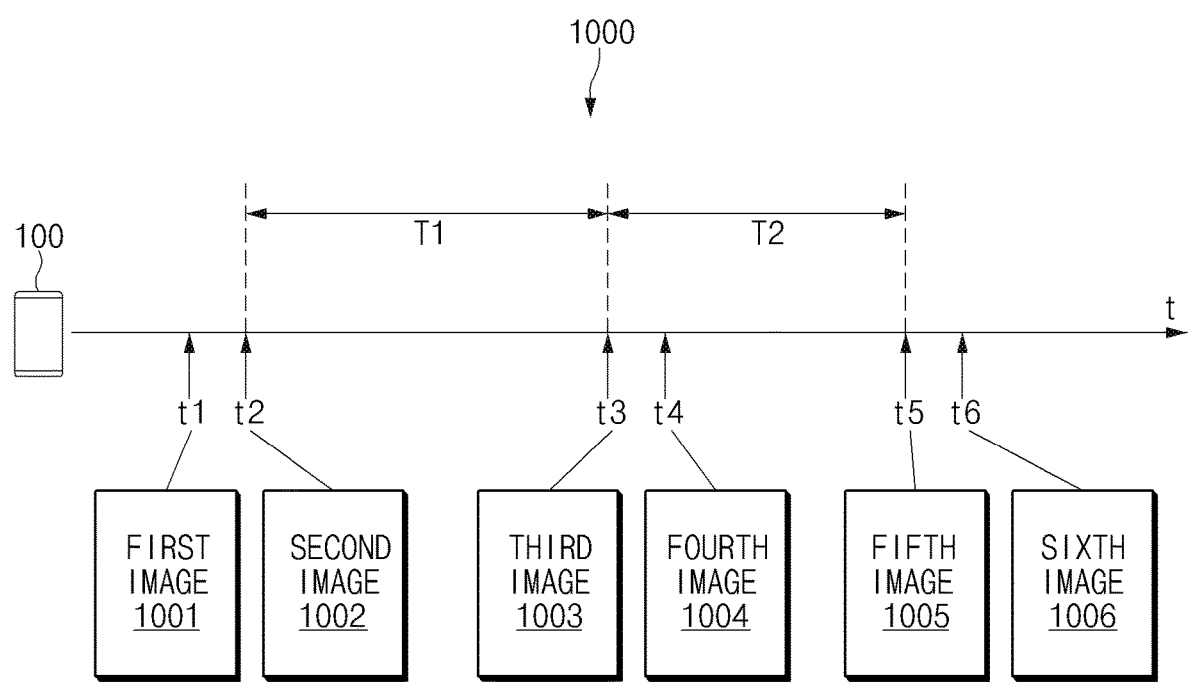
FIG. 10 illustrates a process of obtaining a background image, according to an embodiment.

FIG. 10 illustrates a process 1000 of obtaining an image, according to an embodiment.

Referring to FIG. 10 the electronic device 100 may obtain a first image 1001 (e.g., a first background image) at time t1 and may obtain a second image 1002 (e.g., a second background image) at time t2 (e.g., step 805 in FIG. 8). When the variation between the first image 1001 and the second image 1002 is greater than or equal to a specified value (e.g., No in step 810 in FIG. 8), the electronic device 100 may discard the first image 1001 and the second image 1002.

When failing to generate calibration data, the electronic device 100 may attempt to generate the calibration data again after a specified time (e.g., a first time interval T1). For example, the electronic device 100 may obtain a third image 1003 (e.g., a third background image) at time t3 and may obtain a fourth image 1004 (e.g., a fourth background image) at time t4 (e.g., step 805 in FIG. 8). When the variation between the third image 1003 and the fourth image 1004 is greater than or equal to the specified value (e.g., step 810-N in FIG. 8), the electronic device 100 may discard the third image 1003 and the fourth image 1004. When failing to generate calibration data, the electronic device 100 may attempt to generate the calibration data again after a specified time (e.g., a second time interval T2). Whenever the generation of calibration data fails, the electronic device 100 may reduce the length of the specified time interval. For example, the length of the second time interval T2 may be shorter than the length of the first time interval T1. Alternatively, when the generation of calibration data fails, the electronic device 100 may increase the length of the time interval. For example, the length of the second time interval T2 may be longer than the length of the first time interval T1.

The electronic device 100 may obtain a fifth image 1005 (e.g., a fifth background image) at time t5 and may obtain a sixth image 1006 (e.g., a sixth background image) at time t6 (e.g., step 805 in FIG. 8). When the generation of calibration data continuously fails more than the specified number of times, the electronic device 100 may not attempt to generate the calibration data during a specified period. For example, when the generation of calibration data from the fifth image 1005 and/or the sixth image 1006 fails, the electronic device 100 may attempt to generate the calibration data after a specified time interval (e.g., a time interval longer than the first time interval T1).

When the generation of calibration data continuously fails, the electronic device 100 may change the reference value (e.g., a specified value or a threshold value) of variation (e.g., the amount of dynamic noise). For example, when failing to continuously generate calibration data K times (e.g., K is a natural number of two or more), the electronic device 100 may increase the reference value of the variation for determining whether to generate the calibration data. The performance of the sensor may be reduced depending on an increase in the operating time of the electronic device 100. The electronic device 100 may increase the reference value of variation based on the deterioration of the performance of the sensor.

The electronic device 100 may change the period or frequency for obtaining the plurality of background images depending on the situation of the electronic device 100. For example, the period or frequency may be adjusted depending on the battery condition of the electronic device 100. The period or frequency may be adjusted depending on the importance of the application being used in the electronic device 100. In the case of a financial application requiring the accuracy for fingerprint authentication, to obtain accurate calibration data, the electronic device may adjust the period such that a lot of background images are obtained by reducing the period so that accurate calibration data may be secured.

Figure 11:
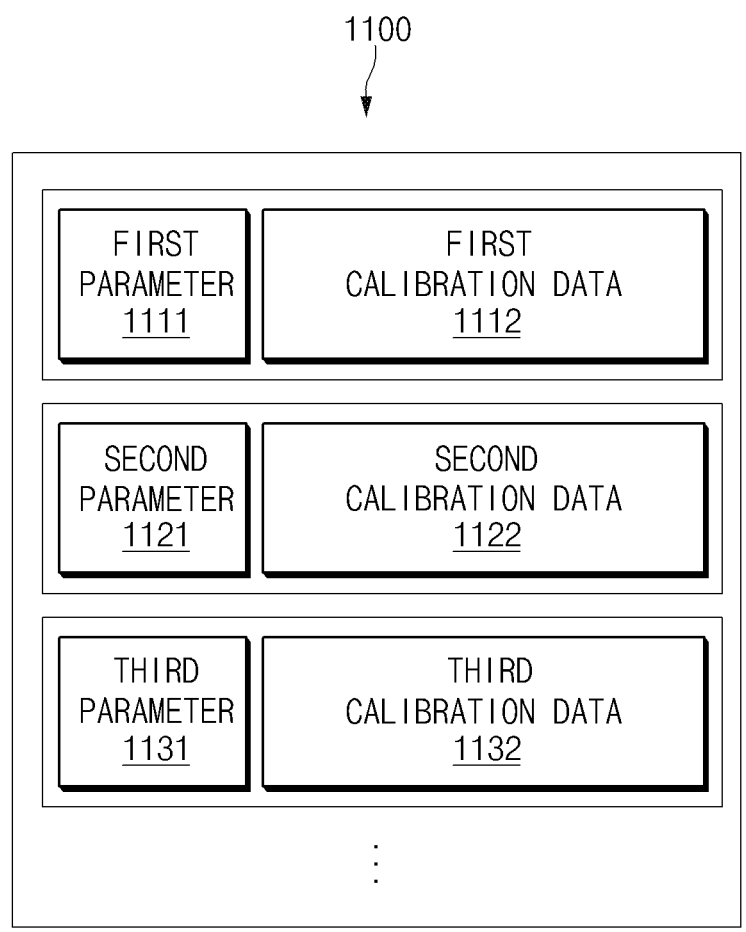
FIG. 11 illustrates a calibration data structure in a memory, according to an embodiment.

FIG. 11 illustrates a calibration data structure 1100 in a memory, according to an embodiment.

When the electronic device 100 stores calibration data in the memory of the electronic device 100 (e.g., step 820 of FIG. 8), the electronic device 100 may store the calibration data together with parameters (e.g., a first parameter, a second parameter, and a third parameter) with which the calibration data is obtained. For example, when first calibration data 1112 is obtained based on a first parameter 1111, the electronic device 100 may store the first calibration data 1112 in a memory to be associated with the first parameter 1111. Similarly, the electronic device 100 may store second calibration data 1122 to be associated with a second parameter 1121 and may store third calibration data 1132 to be associated with a third parameter 1131. The parameter (e.g., the first parameter 1111, the second parameter 1121, and/or the third parameter 1131) associated with the calibration data may include the temperature (e.g., a temperature range) of the electronic device 100 and/or the sensing frequency of the sensor 190. The parameter may include sensing information obtained from the electronic device. The sensing information may include illuminance obtained through an illuminance sensor, position information obtained using a position sensor, or time information. The parameter may include information about an application running on the electronic device. For example, the parameter may include information about financial applications requiring the accuracy for fingerprint authentication, and applications utilizing personal information. The parameter may include information about the inside of the electronic device. For example, the information about the inside of the electronic device may include the capacity and state of the battery of the electronic device, or the temperature and humidity inside the electronic device.

The electronic device 100 may calibrate the fingerprint image, using the stored calibration data (e.g., step 610 of FIG. 6). In this case, the electronic device 100 may calibrate the fingerprint image, using calibration data associated with a parameter corresponding to the current state of the electronic device 100.

Hereinafter, an exemplary structure of the electronic device 100 of FIG. 1 may be described with reference to FIG. 12.

Figure 12:
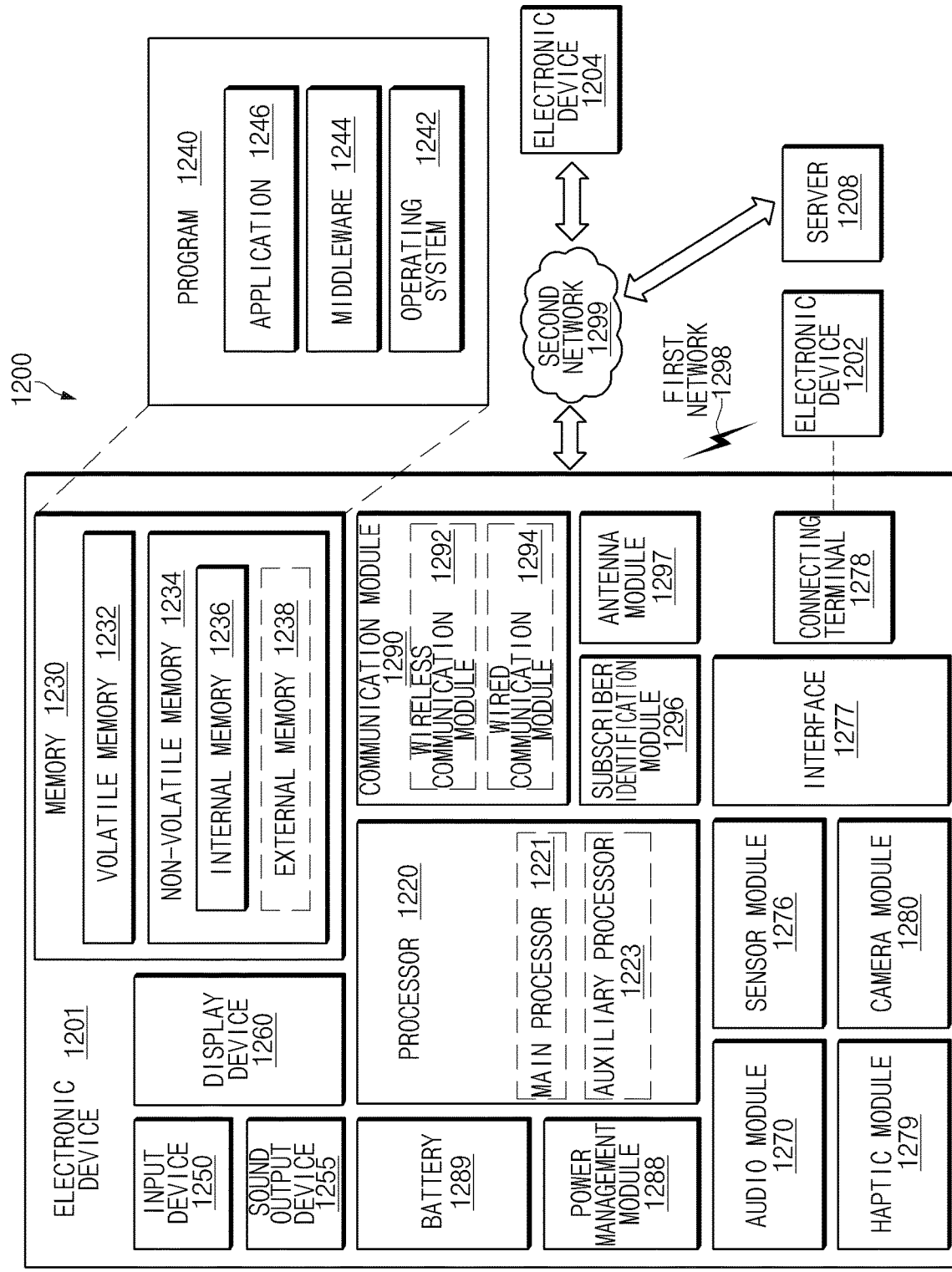
FIG. 12 is a block diagram of an electronic device in a network environment, according to an embodiment.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation.

According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292

(e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

According to an embodiment, an electronic device may include a housing, a display coupled to the housing and displaying an image through a first surface of the display, a fingerprint sensor disposed under the display and obtaining a fingerprint image, a processor operatively connected to the display and the fingerprint sensor, and a memory operatively connected to the processor. The memory may store instructions that, when executed, cause the processor to obtain a plurality of background images, using the fingerprint sensor, to obtain a variation between the plurality of background images, when the variation satisfies a specified condition, to generate calibration data, using at least one background image of the plurality of background images, and to store the generated calibration data in the memory.

The instructions, when executed, may cause the processor to discard the plurality of background images when the specified condition is not satisfied.

The instructions, when executed, may cause the processor to generate the calibration data based on an average value of two or more of the plurality of background images.

The instructions, when executed, may cause the processor to generate the calibration data based on one background image the plurality of background images.

The instructions, when executed, may cause the processor to obtain the variation based on a standard deviation or a variance of the plurality of background images.

The instructions, when executed, may cause the processor to obtain the variation based at least partly on a sum of standard deviations or variances between pixels included in the plurality of background images.

The instructions, when executed, may cause the processor to store the calibration data in the memory in association with a parameter of the electronic device upon obtaining the plurality of background images.

The instructions, when executed, may cause the processor to obtain the plurality of background images when an external object is not detected on a region of the display corresponding to the fingerprint sensor. The calibration data may include noise information associated with the fingerprint sensor.

The instructions, when executed, may cause the processor to obtain a fingerprint image from a finger positioned on a region of the display corresponding to the fingerprint sensor, using the fingerprint sensor, to calibrate the fingerprint image, using the calibration data, and to perform authentication, using the calibrated fingerprint image.

The fingerprint sensor may be configured to obtain the fingerprint image and the plurality of background images, using an optical signal or an ultrasonic signal.

According to an embodiment, a method for generating calibration data of an electronic device may include obtaining a plurality of background images through at least part of a display of the electronic device, using a fingerprint sensor positioned under the display of the electronic device, obtaining a variation between the plurality of background images, when the variation is less than or equal to a threshold value, generating calibration data for the fingerprint sensor, using at least one background image of the plurality of background images, and storing the generated calibration data in a memory of the electronic device.

The method may further include discarding the plurality of background images when the variation is greater than or equal to the threshold value.

Generating the calibration data may include generating the calibration data based on an average value of two or more of the plurality of background images. Generating the calibration data may include generating the calibration data based on one background image of the plurality of background images.

Obtaining the variation may include obtaining the variation based on a standard deviation or variance of the plurality of background images. Obtaining the variation may include obtaining the variation based at least partly on a sum of standard deviations or variances between corresponding pixels of the plurality of background images.

Storing the generated calibration data in the memory of the electronic device may include storing the calibration data in the memory in association with a parameter of the electronic device upon obtaining the plurality of background images.

Obtaining the plurality of background images may include obtaining the plurality of background images when an external object is not detected on a region of the display corresponding to the fingerprint sensor, and the calibration data may include noise information associated with the fingerprint sensor.

The method may further include obtaining a fingerprint image from a finger positioned on a region of the display corresponding to the fingerprint sensor, using the fingerprint sensor, calibrating the fingerprint image, using the calibration data, and performing authentication, using the calibrated fingerprint image. The fingerprint sensor may be configured to obtain the fingerprint image and the plurality of background images, using an optical signal or an ultrasonic signal.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor(e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the specification, it is possible to prevent dynamic noise components from being reflected in calibration data.

Furthermore, according to various embodiments disclosed in the specification, the fingerprint recognition may be performed more accurately because the calibration data contains a reduced amount of dynamic noise.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a housing;
   a display;
   a fingerprint sensor disposed under the display and configured to obtain a fingerprint image;
   a processor operatively connected to the display and the fingerprint sensor; and
   a memory operatively connected to the processor,
   wherein the memory stores instructions that, when executed, cause the processor to:
      obtain a plurality of background images, using the fingerprint sensor;
      obtain a variation between the plurality of background images;
      when the variation is less than a specified value, generate calibration data, using at least one background image of the plurality of background images, and
      store the generated calibration data in the memory, and
      when the variation is greater than or equal to the specified value, discard the plurality of background images and retry to obtain background images after a specified time interval elapsed,
      wherein the specified time interval set based on battery status of the electronic device, and
      wherein the variation is obtained based at least partially on a sum of standard deviations.

2. The electronic device of claim 1, wherein the instructions, when executed, further cause the processor to:
   generate the calibration data based on an average value of the plurality of background images.

3. The electronic device of claim 1, wherein the instructions, when executed, further cause the processor to:
   generate the calibration data based on one background image of the plurality of background images.

4. The electronic device of claim 1, wherein the instructions, when executed, further cause the processor to:
   store the calibration data in the memory in association with a parameter of the electronic device upon obtaining the plurality of background images.

5. The electronic device of claim 1, wherein the instructions, when executed, further cause the processor to:
   when an external object is not detected on a region of the display corresponding to the fingerprint sensor, obtain the plurality of background images.

6. The electronic device of claim 1, wherein the instructions, when executed, further cause the processor to:
   obtain a fingerprint image from a finger positioned on a region of the display corresponding to the fingerprint sensor, using the fingerprint sensor;
   calibrate the fingerprint image, using the calibration data; and
   perform authentication, using the calibrated fingerprint image.

7. The electronic device of claim 6, wherein the fingerprint sensor is configured to obtain the fingerprint image and the plurality of background images, using an optical signal or an ultrasonic signal.

8. A method for generating calibration data of an electronic device, the method comprising:
   obtaining a plurality of background images through at least part of a display of the electronic device, using a fingerprint sensor positioned under the display of the electronic device;
   obtaining a variation between the plurality of background images;
   when the variation is less than a threshold value, generating calibration data for the fingerprint sensor, using at least one background image of the plurality of background images and storing the generated calibration data in a memory of the electronic device; and
   when the variation is greater than or equal to the threshold value, discarding the plurality of background images and retrying to obtain background images after a specified time interval elapsed,
   wherein the variation is obtained based at least partially on a sum of standard deviations.

9. The method of claim 8, wherein obtaining the plurality of background images includes obtaining the plurality of background images based on a specified period.

10. The method of claim 9, further comprising:
    when the calibration data is not generated, changing the specified period to obtain the plurality of background images.

11. The method of claim 8, wherein generating the calibration data includes generating the calibration data based on one background image of the plurality of background images.

12. The method of claim 8, wherein obtaining the plurality of background images includes obtaining the plurality of background images when an external object is not detected on a region of the display corresponding to the fingerprint sensor, and
    wherein the calibration data includes noise information associated with the fingerprint sensor.

13. The method of claim 8, further comprising:
    obtaining the plurality of background images when information obtained through at least one sensor of the electronic device satisfies a specified condition.

* * * * *

UNITED STATES PATENT AND TRADEMARK OFFICE
CERTIFICATE OF CORRECTION

Page 1 of 1

PATENT NO.       : 11,222,191 B2
APPLICATION NO.  : 16/986939
DATED            : January 11, 2022
INVENTOR(S)      : Jungwoo Choe It is certified that error appears in the above-identified patent and that said Letters Patent is hereby corrected as shown below:

On the Title Page

Item (12):
Delete "Jungwoo CHO"
And insert:
--Jungwoo CHOE--.

Item (72) Inventor:
"Jungwoo CHO"
Should be:
--Jungwoo CHOE--.

Signed and Sealed this
Second Day of August, 2022

Katherine Kelly Vidal
*Director of the United States Patent and Trademark Office*